Aug. 15, 1944.　　　L. F. HAMMAND　　　2,355,648
SIGNALING DEVICE
Filed Nov. 29, 1941
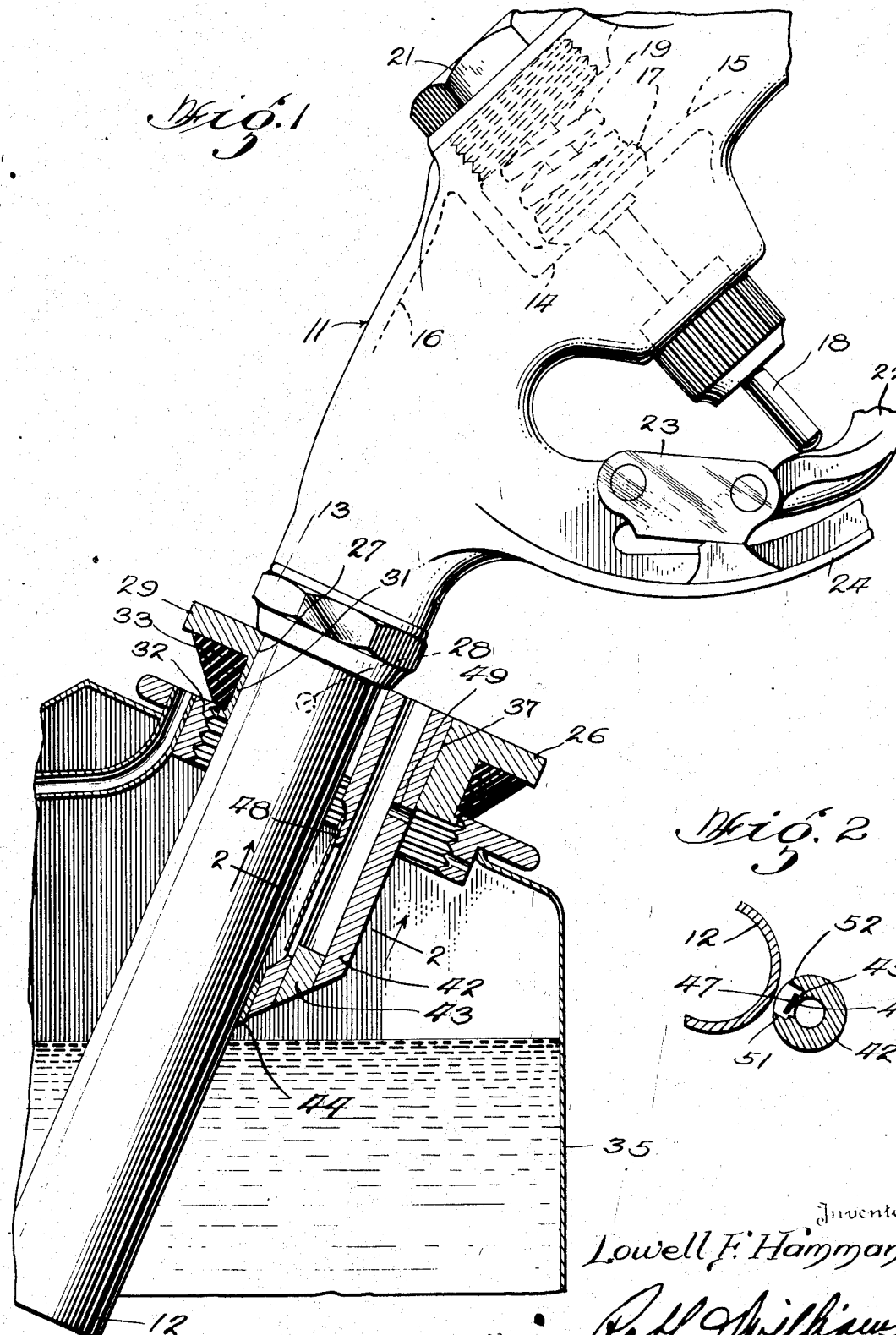
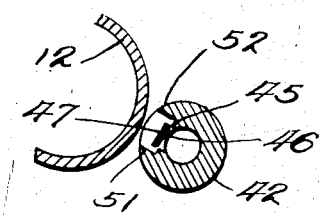
Inventor
Lowell F. Hammand
Attorney

UNITED STATES PATENT OFFICE 2,355,648

SIGNALING DEVICE

Lowell F. Hammand, Washington, D. C.

Application November 29, 1941, Serial No. 420,969

1 Claim. (Cl. 116—109)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to gasoline dispensing equipment and more particularly to a novel and improved form of signaling device having an audible signal to indicate the level of the liquid in the container being filled.

One of the principal objects of this invention is to provide a signaling nozzle including a tone producing structure so arranged and constructed that an audible sound is emitted throughout the period of time in which the container is being filled. The termination of the audible tone indicates that the level of liquid in the container has reached the predetermined level.

A further object of the invention is the provision of an improved signal whistle structure of simple and rugged construction, having no complicated operating parts and capable of withstanding great physical abuse.

A further object of the invention is the provision of a nozzle signaling device including a tone chamber and a vibrating reed, together with means for rendering the signal inoperative when the level of the liquid in the container being filled reaches a predetermined level.

A further object of the invention is to provide an improved audible signal indicator of such design and construction as to be operative within wide limits of rate of flow and pressure, in order to be equally well adapted for use with liquids under pressure or gravity feed.

Before describing the detailed structure illustrated in the drawing, it is believed pertinent to point out that the present structure has been developed primarily to meet present military requirements in which it has been found desirable to provide gasoline dispensing nozzles so arranged as to indicate when the level of liquid in the container being filled reaches a predetermined level, so that the operator may manually close the valve before the container being filled overflows.

It is also believed to be pertinent to point out that in modern military operations, the use of large stationary or movable gasoline tanks in combat operations is frowned on for the reason that any large container becomes an obvious target for enemy aircraft attack or artillery bombardment. It is the present preferred military practice to refuel tanks, aircraft or other combat vehicles from relatively small metal containers shipped into the battle zone by truck loads, and of such size and shape that they may be easily concealed in locations spaced apart from each other, so that they will not present such a vulnerable target to the enemy. These individual containers are filled from larger tanks or tank cars back of the zone of combat and after being emptied in the refueling operations in the field are returned behind lines for subsequent refilling.

In view of the tremendous quantities of gasoline utilized in modern military operations, and the obvious dangers incident to the spilling of inflammable fuel near the storage tanks, it will be apparent that some means must be provided for filling such small containers so that large numbers of them may be quickly filled to the desired level without danger of overflow. It should not be overlooked, however, that the rough treatment and abuse that military equipment of this character necessarily receives, prevents the use of any structure except the most rugged and simple available. Also, since operations of the character described are preferably carried out in absolute darkness, ordinary visual types of indicating devices are entirely impractical.

Referring more particularly to the drawing;

Fig. 1 is a central sectional view of a signal structure constructed in accordance with the teachings of the present disclosure, and is illustrated as applied to a conventional type of gasoline dispensing nozzle.

Figure 2 is a detail sectional view taken substantially on the plane of the line 2—2 in Fig. 1.

In order that the signal indicator device may be utilized in connection with standard gasoline dispensing equipment of conventional design and proven merit, and to avoid any necessity of special tooling or the construction of any complicated type of apparatus, the signal indicator device is designed and constructed so that it may be applied to a conventional dispensing nozzle, either permanently or temporarily, and without requiring any substantial changes in design of the nozzle structure. In the present invention the signaling devices are provided in a separate nozzle conversion unit so arranged and constructed that it may be instantly applied to any of the standard forms of nozzles now adapted for use in the Army, and when so attached will convert the standard type of dispensing nozzle into an audible signal indicating nozzle whereby the operator will be warned that the liquid level in the vessel being filled has reached a predetermined level so that he may manually shut off the fuel flow in time to prevent overflow.

In the drawing, the numeral 11 indicates a gasoline dispensing valve body, which is provided with a spout 12 secured to the body 11 by the threaded nut 13. The valve body 11 also includes a valve seat arranged to separate the inlet passageway from the discharge passageway. The valve seat is normally closed by a valve at the upper end of the valve stem 18 and normally urged downwardly into engagement with the valve seat by a compression spring in the conventional manner.

An operating handle 22 and link 23 are pivotally mounted at the forward end of the handle guard 24 so that the operator may grasp the handle 22 to force the valve stem 18 inwardly and lift the valve from the seat to permit the liquid to flow through the discharge passageway and outwardly through the lower end of the spout 12.

The structures thus far described are entirely conventional and well-known in the art, and since they do not form a pertinent part of this invention except in connection with the structure to be hereinafter described, they will not be mentioned in greater detail in this application.

The audible signal conversion unit consists of a stopper body 26 drilled with a large cylindrical opening 27 through which the spout 12 of the nozzle extends. A setscrew 28 is threaded into the stopper body, to secure the stopper in position on the spout. The stopper body 26 is preferably formed of metal and is arranged to include an annular flange 29 and a neck portion 31 terminating in a small lip 32 arranged to maintain a resilient gasket 33 in position on the neck. The resilient gasket is preferably provided with an angularly inclined sealing surface of size and shape to firmly engage the inner walls of the mouth of a sheet metal fuel container 35. As illustrated, the container 35 constitutes a standardized type of five-gallon fuel container from which Army vehicles are customarily refueled in the field.

The stopper body is drilled with a bore 37 to receive a downwardly extending thick-walled tube 42 which extends downwardly parallel to and closely adjacent the spout of the dispensing nozzle. The lower end of the tube 42 is closed by a plug 43 and is preferably beveled at an angle of about 45 degrees to facilitate entry of the signaling structure into the mouth of the container. The walls of the tube 42 are of sufficient thickness to provide extreme strength and no auxiliary supporting means are ordinarily required, but if desired the lower extremity of the tube may be welded to the dispensing spout as indicated at 44. The tube 42 is milled at 45 to provide a flat portion between the body of the tube and the spout, and a somewhat shorter milled opening 46 is provided so that a vibrating metallic reed 47 may be welded or otherwise secured to the flat portion 45 at the point 48 and may extend downwardly so that its free end overlies the milled opening 46. One or more vent ports 49 are provided in the tube walls immediately below the lower portion of the stopper lug body.

In operation, the operator will insert the spout of the dispensing nozzle into the mouth of the container and press the resilient gasket of the stopper plug against the rim of the container to substantially seal the mouth of the container against the flow of air. Thus, as the liquid enters the container through the spout of the nozzle, the air trapped within the container will be forced outwardly through the passageway 46 and the port 49, and thence upwardly through the tube 42 to the atmosphere. The vent ports 49 will be understood to be of such dimensions that during the normal flow of liquid into the container they will not entirely relieve the air pressure existing inside of the container mouth so that even though the vent ports are completely open a certain amount of air will flow inwardly past the vibrating reed 47, and through the passageway 46. This flow of air will move the reed and cause it to vibrate, so as to emit a signal tone that is audible to the operator.

As the liquid level within the container rises, it will finally submerge the reed 47 and prevent the vibratory movement of the reed, thus silencing the signal. At this time the port 49 will remain open to the air in the container, however, and will permit the egress of air so that pressure within the container will not build up to any point sufficient to damage the reed. The signal emits a continuous audible tone as long as the liquid is flowing into the container. The cessation of the signal tone indicates that the predetermined liquid level has been reached so that the operator may manually close the nozzle valve.

From the foregoing, it will be apparent that by practicing the teachings of the present invention it is possible to provide a highly satisfactory signal indicating nozzle of extremely simple construction capable of entirely satisfactory operation even under the most adverse circumstances of use. It will be noted, of course, that the entire nozzle structure may be of conventional design and construction and the indicating features included by the simple addition of a few comparatively inexpensive parts. In military operations, the indicator here disclosed is of particularly desirable construction since it is simple in construction and operation, and can be subjected to great abuse without damage. In this connection, it will be noted that the entire stopper body and particularly the whistle structure is quite well protected against accidental damage, since it lies closely adjacent the threaded nut 13 of the nozzle and is close to the nozzle handle guard 24 so that a line drawn between the lower extremity of the nozzle 12 and the guard 24 will not intercept any portion of the stopper body construction. This, of course, means that the stopper is not apt to be damaged by being dropped on the ground or even against steel or concrete surfaces, since the force of any accidental impact will be more apt to be delivered to the nozzle 12 or the guard 24. The reed 47 is well protected by its position between the tube 42 and the spout 12, and also by the side shoulders 51 and 52 on opposite sides of the milled portion 45. Further, the conventional type of nozzle may be altered to provide a warning signal without making any changes in its inherent design. It will also be appreciated that the signal is entirely positive in operation, since the medium by which it is operated is the air entrapped within a closed container and this flow may be depended upon since it is utterly impossible to fill the container with liquid without causing the corresponding discharge of air, so that the operation of the signal device is entirely independent of the pressure at which the fuel is admitted to the nozzle. The rate of flow of the fuel may also vary within wide limits without affecting the efficiency of the device, since with the signal constructed as illustrated in the drawing a comparatively small rate of flow will emit a distinctly audible signal and the flow may be greatly increased without materially affecting the operation of the device.

I have shown and described the present invention in the preferred form as developed for military purposes. I am, however, aware that it is subject to numerous alterations and modifications without departing from the spirit of the invention and I, therefore, do not wish to be limited except as by the scope of the appended claim.

I claim:

A signal device for indicating a predetermined level of liquid in a container, comprising a body adapted for temporary application to the filling orifice of a container, said body having an opening therethrough for the passage of a pouring nozzle, and a tube extending into the receptacle provided with a passage opening to the atmosphere through the upper end of the tube and a port communicating with the interior of the container, said tube having an elongated slot in one side thereof and a vibrating reed attached at one end to said tube and extending over said slot and adapted to be vibrated by a part of the air passing from the container as it is being filled, to emit an audible sound, said tube and reed being positioned to be enveloped by the liquid when the same has reached the desired level in the container, to prevent further vibration of the reed and thereby silence the same.

LOWELL F. HAMMAND.